Nov. 10, 1959    H. J. C. NIEUWENHOVEN    2,911,896
FOCAL PLANE SHUTTER
Filed Dec. 3, 1956

INVENTOR.
H. J. C. NIEUWENHOVEN
BY
Attys.

United States Patent Office 2,911,896
Patented Nov. 10, 1959

2,911,896

FOCAL PLANE SHUTTER

Hendricus Jacobus Cornelis Nieuwenhoven, Rijswijk, Netherlands, assignor to N. V. Optische Industrie "De Oude Delft," Delft, Netherlands Application December 3, 1956, Serial No. 625,667

Claims priority, application Netherlands December 6, 1955

1 Claim. (Cl. 95—57)

The invention relates to focal plane shutters, and more particularly to a focal plane shutter of the type in which the slot of the shutter band is covered by a sliding member, for instance a metal plate, during the winding up movement of the band and is uncovered to a predetermined width during the release or exposure movement of the shutter band. The sliding member is slidably connected to the shutter band and may be moved automatically into its various positions relative to the slot by means of stops positioned in the shutter housing so as to engage the sliding member at predetermined points in its stroke.

Known shutters of the type referred to are disadvantageous in that their reliability and efficiency regarding the shut-off action of the sliding member during the rewinding stroke of the shutter band is not so complete as would be desirable in view of the high sensitivity of modern film materials. A further drawback of known shutters of this type, having an adjustable slot width, resides in that the adjusting means are complicated and relatively heavy and bulky and, therefore, do not lend themselves very well for the construction of modern cameras which should have small dimensions and high exposure repetition rates.

It is a first object of the invention to provide an improved focal plane shutter of the type described which is under all conditions completely light tight during the rewinding stroke of the band. A further object is to provide an adjustable shutter of this type having small weight and dimensions, so as to permit higher speeds of the shutter band and to take less space than heretofore possible. Another object is to reduce in number and simplify the means for adjusting the width of the slot.

According to the invention the sliding member is H-shaped in cross section such that both of the edges of the slot lie between the vertical legs of the H when the shutter band is on its winding-up stroke. At the end of this stroke one of the edges is automatically drawn out from the sliding member and the slot is uncovered for the exposure stroke. At the end of the exposure stroke the sliding member is again moved relative to the band so that the slot is covered and the edge which was free during the exposure stroke is engaged again by the sliding member. This edge together with the sliding member thus forms a very effective light lock during the winding-up stroke of the band which safely shuts off the light from the film.

Figure 1:
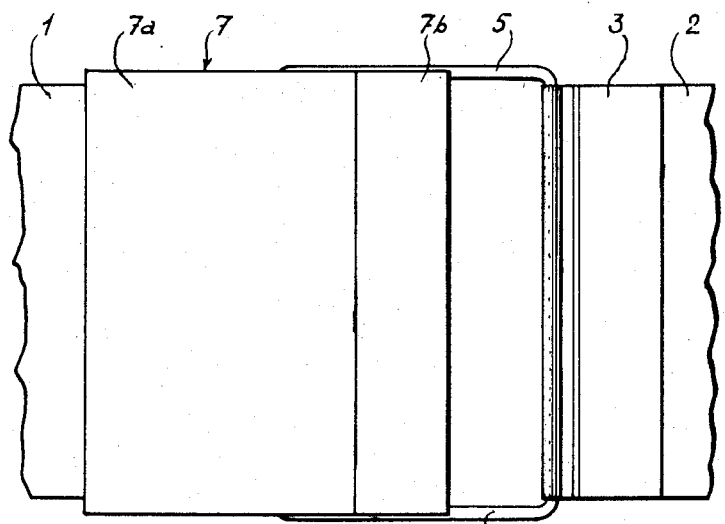
Figure 2:
Figure 3:
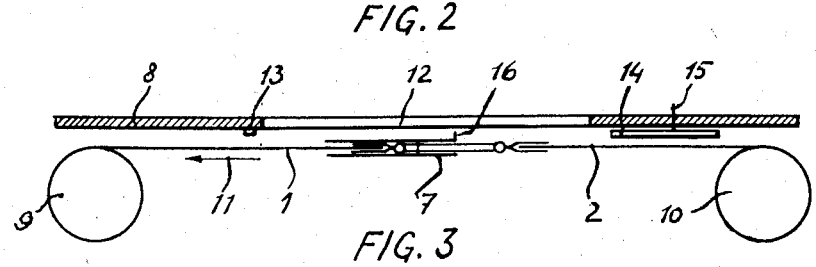

The invention may be better understood from the following description of an embodiment shown in the drawing, in which Fig. 1 is a partial front view of a focal plane shutter;

Fig. 2 is a longitudinal cross section of the focal plane shutter shown in Fig. 1; and Fig. 3 is a similar longitudinal cross section on a reduced scale, showing means for moving the sliding member with respect to the shutter band.

The flexible band consists of two parts 1, 2 only partly shown in Figs. 1 and 2. These parts terminate in substantially U-shaped strips 3 and 4 and may be connected thereto in any appropriate manner, for instance by gluing or pressing. The strips 3 and 4 are interconnected by U-shaped rods 5 and 6, leaving a slot between both parts of the shutter band. Part 1 of the band is provided with the sliding member 7 which is in the shape of an H in cross section. It is built up from two U-shaped metal strips 7a and 7b, whose backs are welded or soldered together.

In Fig. 3 a particular way is illustrated in which the sliding member may be moved into its respective positions with respect to the slot. To the wall 8 of the shutter housing a stop 13 is attached. When the shutter band 1, 2 is moved for exposure in the direction indicated by the arrow 11 from the spool 10 onto the spool 9 a lateral extension 16 on the sliding member engages the stop 13 and during the last part of the stroke the sliding member is held in this position, so that the edge of the strip 3 is inserted between the legs of part 7b of the sliding member. Now the band 1, 2 is moved to the right for rewinding of the shutter with the slot fully covered by the sliding member 7. Near the end of the stroke extension 16 engages an adjusable stop member 14 which has been illustrated in Fig. 3 as an eccentric wheel which may be rotated around a shaft 15 from outside the camera. Thus, the sliding member 7 is withheld from further movement along with the band 1, 2 and the slot is uncovered to a selected width corresponding to the position of the eccentric wheel. In this way a reliable and simple shutter control is realized.

What I claim is:

Focal plane shutter comprising a band having a slot therein to be moved substantially parallel to and adjacent the plane of a light sensitive film, a sliding member slidably connected to said band to cover said slot of said band in a first position and to uncover said slot in a second position, means for moving said sliding member into said first position relative to said band at the end of the release movement of said band and means for moving said sliding member into said second position at the end of the winding up movement of said band, said sliding member being H-shaped in cross section and the edges of said slot lying between the vertical legs of the H in said first position, said means for moving said sliding member into said second position comprising an adjustable stop cooperating with said sliding member to uncover said slot of said band to a preselected width.

References Cited in the file of this patent

UNITED STATES PATENTS 2,664,800    Mayo _____ Jan. 5, 1954

FOREIGN PATENTS 633,551    Germany _____ July 29, 1936